US009628654B2

United States Patent
Konno et al.

(10) Patent No.: US 9,628,654 B2
(45) Date of Patent: Apr. 18, 2017

(54) PROCESSING DEVICE, IMAGE READING DEVICE, IMAGE FORMING APPARATUS, AND PROCESSING METHOD

(71) Applicants: Yoshio Konno, Kanagawa (JP); Masamoto Nakazawa, Kanagawa (JP); Hiroki Shirado, Kanagawa (JP)

(72) Inventors: Yoshio Konno, Kanagawa (JP); Masamoto Nakazawa, Kanagawa (JP); Hiroki Shirado, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/922,546

(22) Filed: Oct. 26, 2015

(65) Prior Publication Data

US 2016/0119495 A1 Apr. 28, 2016

(30) Foreign Application Priority Data

Oct. 28, 2014 (JP) .................................. 2014-219244

(51) Int. Cl.
*G06F 3/12* (2006.01)
*H04N 1/00* (2006.01)
(Continued)

(52) U.S. Cl.
CPC ......... *H04N 1/00896* (2013.01); *H04N 1/193* (2013.01); *H04N 1/40056* (2013.01)

(58) Field of Classification Search
None
See application file for complete search history.

(56) References Cited

U.S. PATENT DOCUMENTS 7,770,799 B2 * 8/2010 Wang ................. G06K 7/10722
235/462.44
8,314,376 B2 * 11/2012 Watanabe ......... H01L 27/14609
250/208.1
(Continued)

FOREIGN PATENT DOCUMENTS

JP 2000-324403 11/2000
JP 2006-058603 3/2006
(Continued)

OTHER PUBLICATIONS

U.S. Appl. No. 14/745,967, filed Jun. 22, 2015.
U.S. Appl. No. 14/750,143, filed Jun. 25, 2015.

*Primary Examiner* — Dung Tran
(74) *Attorney, Agent, or Firm* — Oblon, McClelland, Maier & Neustadt, L.L.P.

(57) ABSTRACT

A processing device includes: a control-signal generating unit that generates a control signal by switching a predetermined potential and a second potential that is different from the predetermined potential; multiple processing units that, if a potential of the control signal is the predetermined potential, flow a predetermined current, process and outputs an input signal, and if a potential of the control signal is the second potential, do not flow the predetermined current and do not process a signal; and a control unit that controls the control-signal generating unit such that, in a case of an operating mode in which the processing units process a signal, the control signal is a voltage signal of the predetermined potential, and in a case of a standby mode in which the processing units do not process a signal, the control signal is a voltage signal of the second potential.

16 Claims, 15 Drawing Sheets

(51) Int. Cl.
*H04N 1/193* (2006.01)
*H04N 1/40* (2006.01)

(56) References Cited

U.S. PATENT DOCUMENTS

| | | | | |
|---|---|---|---|---|
| 8,355,068 | B2* | 1/2013 | Kondo | H04N 5/378 348/308 |
| 9,001,346 | B2* | 4/2015 | Nakazawa | H04N 1/00896 358/1.14 |
| 2002/0178389 | A1* | 11/2002 | Satoh | H04N 1/00885 713/310 |
| 2005/0012468 | A1* | 1/2005 | Ryu | H05B 41/392 315/274 |
| 2007/0188638 | A1 | 8/2007 | Nakazawa et al. | |
| 2008/0150874 | A1 | 6/2008 | Kida et al. | |
| 2008/0231878 | A1* | 9/2008 | Yano | G03G 15/5004 358/1.13 |
| 2008/0252787 | A1 | 10/2008 | Nakazawa et al. | |
| 2010/0027061 | A1 | 2/2010 | Nakazawa | |
| 2010/0171998 | A1 | 7/2010 | Nakazawa | |
| 2010/0195150 | A1* | 8/2010 | Takahashi | G03G 15/5004 358/1.15 |
| 2010/0238332 | A1 | 9/2010 | Watanabe | |
| 2011/0026083 | A1 | 2/2011 | Nakazawa | |
| 2011/0051201 | A1 | 3/2011 | Hashimoto et al. | |
| 2011/0063488 | A1 | 3/2011 | Nakazawa | |
| 2011/0093727 | A1* | 4/2011 | Hwang | G06F 1/266 713/320 |
| 2012/0008173 | A1 | 1/2012 | Konno et al. | |
| 2012/0057211 | A1 | 3/2012 | Shirado | |
| 2012/0092732 | A1 | 4/2012 | Nakazawa | |
| 2012/0224205 | A1* | 9/2012 | Nakazawa | H04N 1/00896 358/1.13 |
| 2013/0063792 | A1 | 3/2013 | Nakazawa | |
| 2014/0014283 | A1* | 1/2014 | Lindstrom | D21H 11/18 162/19 |
| 2014/0029065 | A1 | 1/2014 | Nakazawa | |
| 2014/0043629 | A1 | 2/2014 | Shirado | |
| 2014/0204427 | A1 | 7/2014 | Nakazawa | |
| 2014/0204432 | A1 | 7/2014 | Hashimoto et al. | |
| 2014/0211273 | A1 | 7/2014 | Konno et al. | |
| 2014/0368893 | A1 | 12/2014 | Nakazawa et al. | |
| 2015/0098117 | A1 | 4/2015 | Marumoto et al. | |
| 2015/0116794 | A1 | 4/2015 | Nakazawa | |
| 2015/0163378 | A1 | 6/2015 | Konno et al. | |
| 2015/0222790 | A1 | 8/2015 | Asaba et al. | |
| 2015/0278666 | A1* | 10/2015 | Sugimoto | G06K 15/4055 358/1.14 |
| 2015/0278667 | A1* | 10/2015 | Tanaka | G03G 15/5004 358/1.14 |

FOREIGN PATENT DOCUMENTS

| | | |
|---|---|---|
| JP | 2010-219974 | 9/2010 |
| JP | 2012-186527 | 9/2012 |

\* cited by examiner

FIG.13
(a)
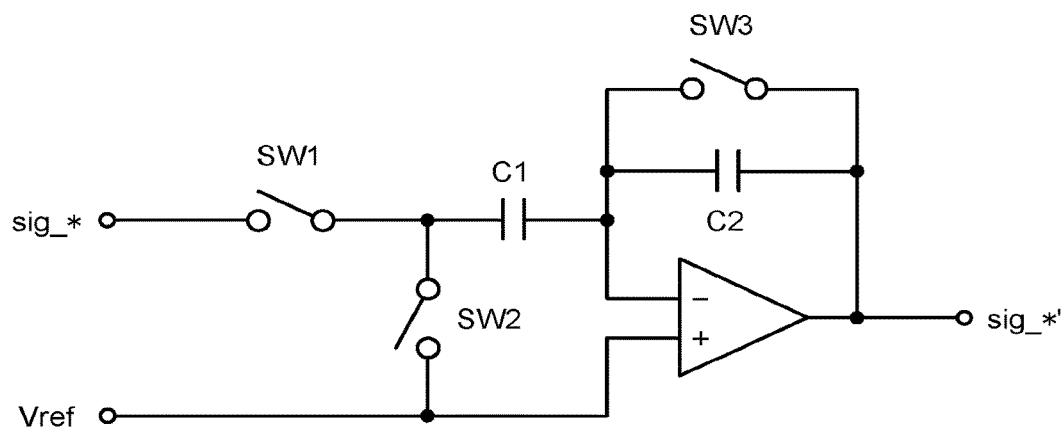
(b)
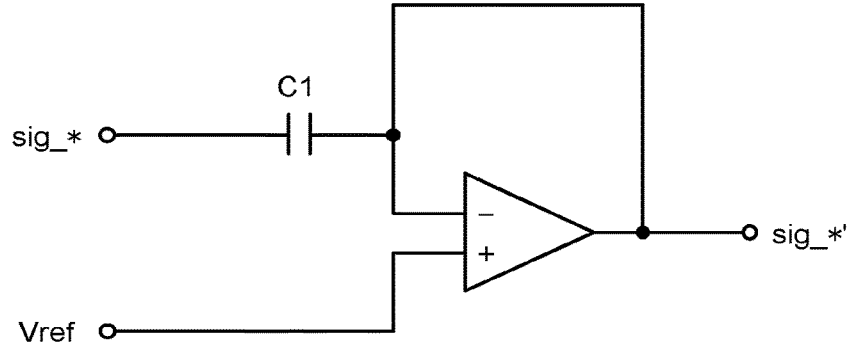
(c)
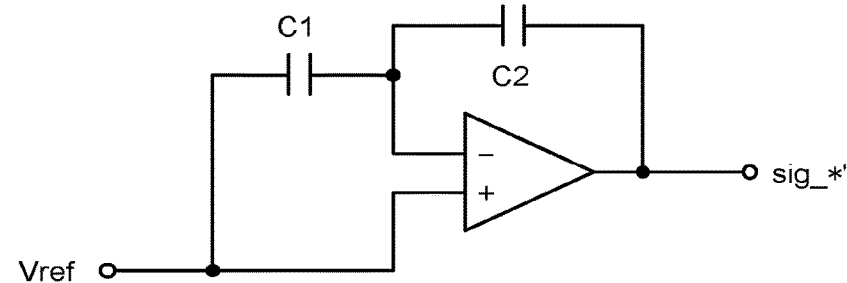

FIG.15
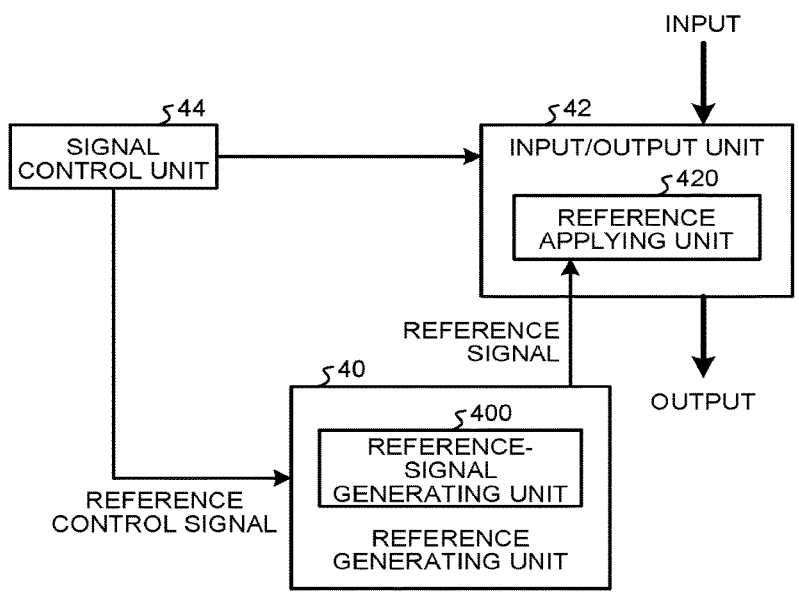
(a) OPERATING STATE
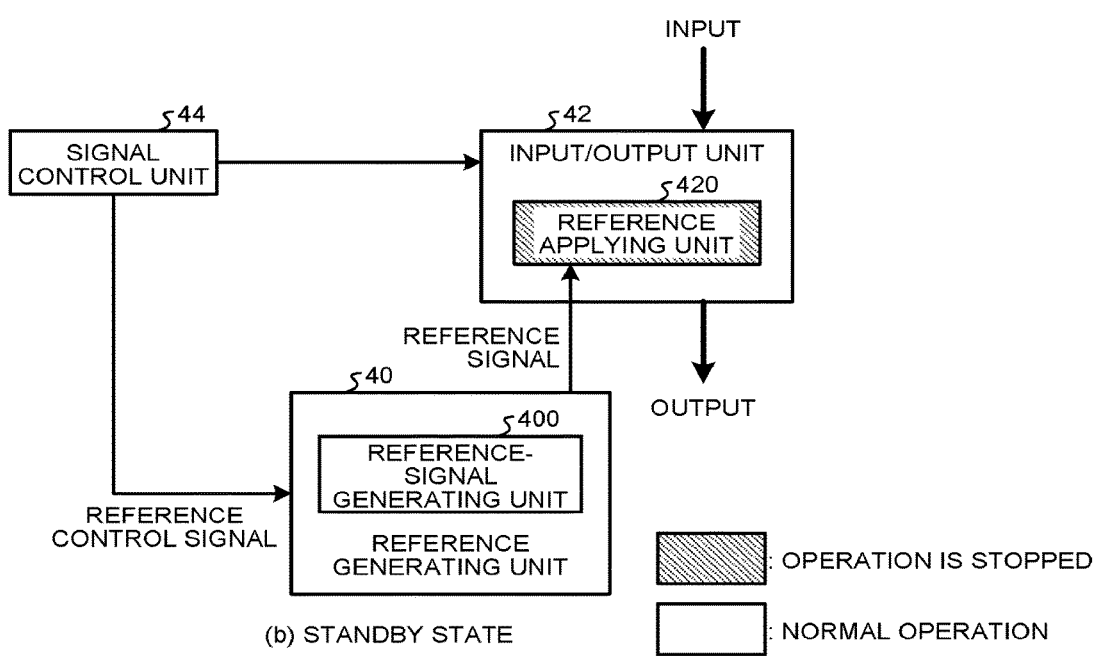
(b) STANDBY STATE

PROCESSING DEVICE, IMAGE READING DEVICE, IMAGE FORMING APPARATUS, AND PROCESSING METHOD

CROSS-REFERENCE TO RELATED APPLICATIONS

The present application claims priority to and incorporates by reference the entire contents of Japanese Patent Application No. 2014-219244 filed in Japan on Oct. 28, 2014.

BACKGROUND OF THE INVENTION

1. Field of the Invention

The present invention relates to a processing device, an image reading device, an image forming apparatus, and a processing method.

2. Description of the Related Art

A scanner includes, for example, a photoelectric conversion element that performs a photoelectric conversion on light that is reflected by an original document; an analog processing unit that performs an operation, such as an A/D conversion, on an analog image signal that is output from the photoelectric conversion element; an image correcting unit that performs various types of correction on a digitally converted image data; and an image transferring unit that transfers image data to a subsequent stage. In accordance with recent requirements for power saving, CMOS sensors have drawn attention as photoelectric conversion elements instead of conventional CCDs, and they have been already used in digital still cameras in general ways.

A CMOS process is used for CMOS sensors, and multiple functions, such as a timing generator (TG) or an analog processing unit, can be integrated. As is the case with scanners, cameras that use CMOS sensors are operated by using a battery, or the like; therefore, there is a very high requirement for power saving in order to enable a long period of operation. Thus, there is a technology in which, as it is no problem if the operation of a CMOS sensor is stopped during a non-capturing time, called a standby state, the operating frequency is decreased during that time so that the power consumption is reduced.

Furthermore, Japanese Patent Application Laid-open No. 2000-324403 discloses a solid-state imaging device in which, during a standby operating mode, on the basis of a dividing-ratio control signal that is obtained by decoding serial data from a serial-data generating unit by using a decoder, a frequency divider circuit divides an atomic clock from an oscillation circuit into eight and sets it as a reference clock.

The conventional technologies for reducing the electric power by decreasing the frequency are effective for CMOS sensors that serially output image signals and that are operated at a high speed by increasing the frequency so as to transfer signals during a specified period. However, in the case of CMOS sensors that output image signals in parallel, the frequency of the drive clock for a pixel circuit is originally about several kHz that is about one hundred times as low as that of conventional CMOS sensors, and decreasing the frequency is less effective for a reduction in the electric power. Furthermore, there is a problem in that, although the current of several dozens of pA flows through a single pixel circuit due to the drive clock, the current of several dozens of μA constantly flows through a bias circuit that is provided in each pixel circuit regardless of the frequency, and this power consumption is dominant.

Therefore, it is desirable to provide a processing device, an image reading device, an image forming apparatus, and a processing method that can achieve a reduction in the power consumption during the standby mode and also achieve a speed-up of a return from the standby mode to the operating mode.

SUMMARY OF THE INVENTION

It is an object of the present invention to at least partially solve the problems in the conventional technology.

According to an aspect of the present invention, there is provided a processing device including: a control-signal generating unit that includes a voltage generating unit that generates a voltage of a predetermined potential and that generates a control signal by switching the predetermined potential and a potential that is different from the predetermined potential; multiple processing units that, if a potential of the control signal is the predetermined potential, flow a predetermined current, process and outputs an input signal, and if a potential of the control signal is the potential that is different from the predetermined potential, do not flow the predetermined current and do not process a signal; and a control unit that controls the control-signal generating unit such that, in a case of an operating mode in which the processing units process a signal, the control signal is a voltage signal of the predetermined potential that is generated by the voltage generating unit and, in a case of a standby mode in which the processing units do not process a signal, the control signal is a voltage signal of the potential that is different from the predetermined potential while the voltage generating unit generates a voltage of the predetermined potential.

According to another aspect of the present invention, there is provided a processing method performed by a processing device, the method including: at a control-signal generating unit, generating a control signal by switching a predetermined potential and a potential that is different from the predetermined potential, the control-signal generating unit including a voltage generating unit that generates a voltage of the predetermined potential; at multiple processing units, flowing a predetermined current if a potential of the control signal is the predetermined potential, processing and outputting an input signal, and not flowing the predetermined current if a potential of the control signal is the potential that is different from the predetermined potential, not processing a signal; and at a control unit, controlling the control-signal generating unit such that, in a case of an operating mode in which the processing units process a signal, the control signal is a voltage signal of the predetermined potential that is generated by the voltage generating unit and, in a case of a standby mode in which the processing units do not process a signal, the control signal is a voltage signal of the potential that is different from the predetermined potential while the voltage generating unit generates a voltage of the predetermined potential.

According to still another aspect of the present invention, there is provided a processing device including: control-signal generating means that include voltage generating means that generate a voltage of a predetermined potential and generate a control signal by switching the predetermined potential and a potential that is different from the predetermined potential; multiple processing means that, if a potential of the control signal is the predetermined potential, flow a predetermined current, process and outputs an input signal, and if a potential of the control signal is the potential that is different from the predetermined potential, do not flow the predetermined current and do not process a signal; and control means that control the control-signal generating means such that, in a case of an operating mode in which the multiple processing means process a signal, the control signal is a voltage signal of the predetermined potential that is generated by the voltage generating means, and in a case of a standby mode in which the multiple processing means do not process a signal, the control signal is a voltage signal of the potential that is different from the predetermined potential while the voltage generating means generate a voltage of the predetermined potential.

BRIEF DESCRIPTION OF THE DRAWINGS

FIG. 13 is a diagram that illustrates the schematic configuration of a PGA and equivalent circuits during operations;

FIG. 15 is a conceptual diagram that conceptually illustrates the operating state and the standby state of the CMOS sensor.

DETAILED DESCRIPTION OF THE PREFERRED EMBODIMENTS

Figure 1:
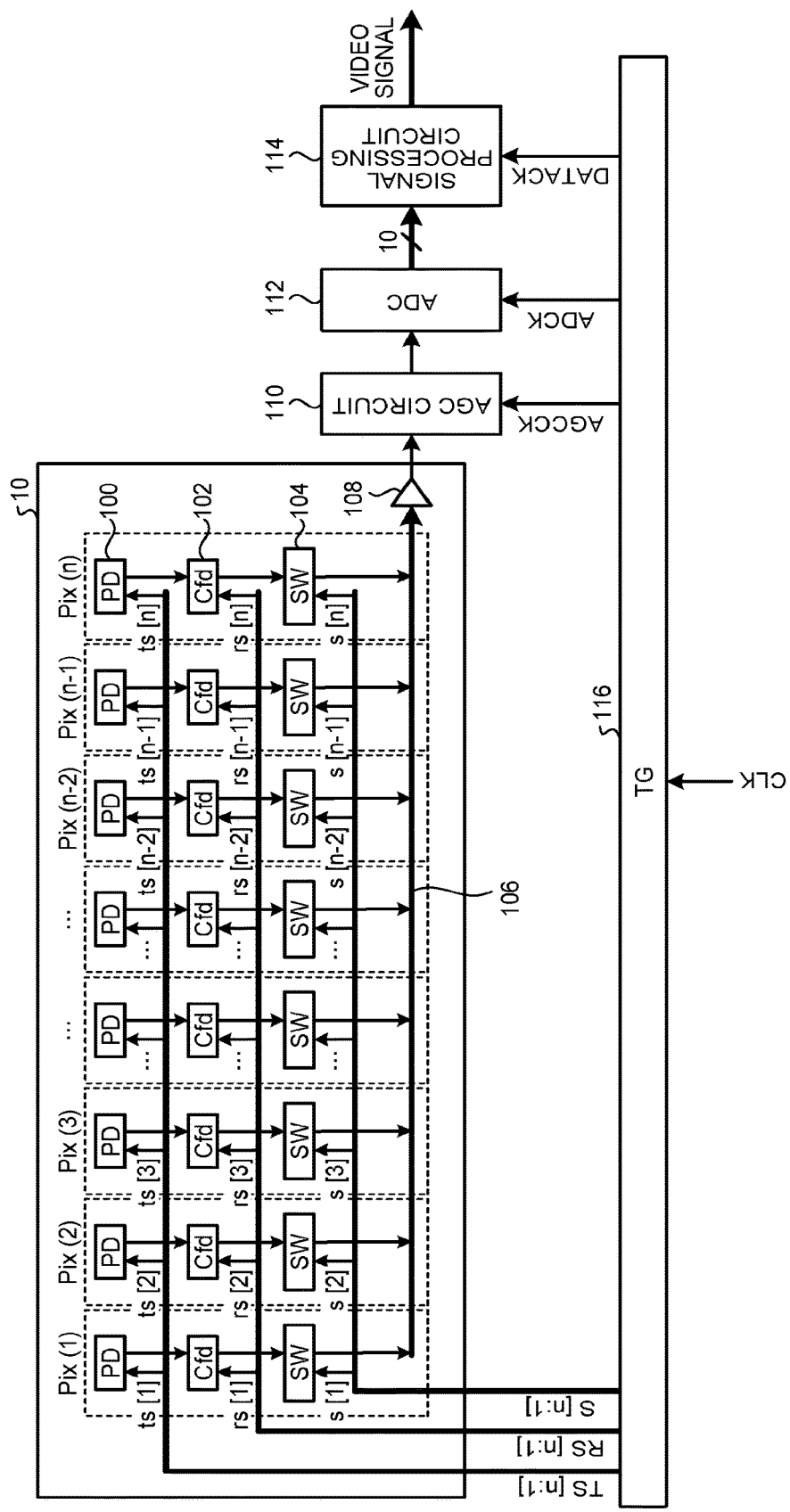
FIG. 1 is a diagram that schematically illustrates an image taking device that includes a CMOS sensor.

First, an explanation is given of the background in which the present invention has been made. FIG. 1 is a diagram that schematically illustrates an image taking device that includes a CMOS sensor (CMOS linear sensor) 10. The CMOS sensor 10 performs a photoelectric conversion on incident light by using a photo diode (PD) 100, converts it into a voltage signal by using an electric-charge detecting unit (Cfd) 102 within a pixel (Pix), passes the image signal, which has been converted into a voltage signal, through a switch (SW) 104 and an analog bus 106, and outputs it from an output buffer 108.

The SW 104 sequentially switches 1 to n pixels so as to obtain the image signal of each pixel as a serial signal. Furthermore, the number of pixels of a CMOS sensor that is used in a typical digital still camera is appropriately horizontal×vertical=5,000×4,000 pixels, and here only the horizontal pixels are illustrated for simplification, and n=5,000.

A drive signal (S [5000]) for driving the SW 104 is a signal that is turn on once during the period of one line. Furthermore, as multiple pixels cannot be simultaneously turned on, the ON timing of each pixel is slightly different. That is, a signal (S [5000:1]) for driving the switch is a signal that is asserted once during the pixel cycle width in the period of one line, and there is the number of signals that corresponds to the number of pixels.

Similarly, a signal (TS [5000:1]) for transferring the electric charge, which is stored in the PD 100, to the Cfd 102 and a signal (RS [5000:1]) for resetting the Cfd 102 are also signals that are asserted once during the pixel cycle width in the period of one line, and there is the number of signals that corresponds to the number of pixels.

Furthermore, although FIG. 1 is simplified as described above, a CMOS area sensor is typically used in a digital still camera, pixel units are arranged in two dimensions in horizontal (appropriately 5,000 pixels)×vertical (appropriately 4,000 pixels) directions, and incident light is converted into electric signals of three colors of RGB so that the signals are acquired.

A control unit (a timing generator; TG) 116 feeds a drive signal for driving the CMOS sensor and feeds various types of clocks to an AGC circuit 110 that amplifies an analog signal that is output from the CMOS sensor 10, an A/D converting unit (ADC) 112 that converts an analog signal into a digital signal, and a signal processing circuit 114.

Furthermore, as the CMOS sensor 10 uses a CMOS process that enables low voltage driving, functional sections other than the above-described ones can be built in the CMOS sensor 10.

Figure 2:
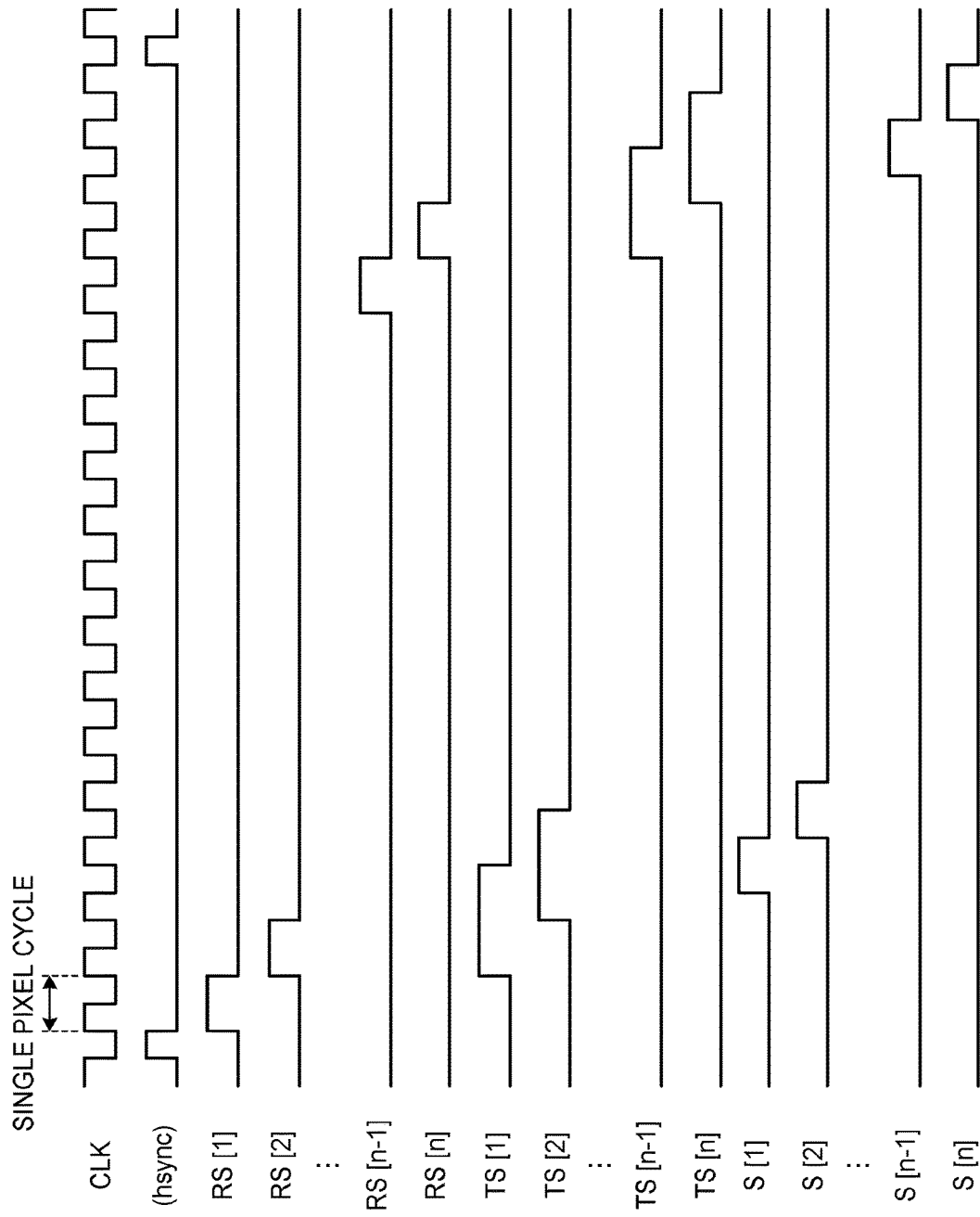
FIG. 2 is a timing chart that schematically illustrates a driving timing of the CMOS sensor that is illustrated in FIG. 1.

FIG. 2 is a timing chart that schematically illustrates a driving timing of the CMOS sensor 10 that is illustrated in FIG. 1. A CMOS-sensor drive signal is generated on the basis of a reference clock (CLK). First, the CMOS sensor 10 turns on RS before an operation of one line is started. The RS is a signal for resetting the electric charge of the electric-charge detecting unit (Cfd) 102, and it cancels (off) the reset state during the period for reading a pixel signal. Furthermore, in a state where the reset state of the Cfd 102 is canceled, the CMOS sensor 10 turns on a transfer signal (TS), transfers the electric charge from the PD 100 to the Cfd 102, and performs a charge-voltage conversion.

Next, the CMOS sensor 10 turns on a switch control signal (S) and outputs, to the analog bus 106, an image signal that has been converted into a voltage signal. The analog bus 106 is a bus that is connected to outputs of all the pixels, only any one of the pixels is connected thereto at certain timing, the other pixels are set in a disconnected state by the SW 104, and the analog bus is commonly used for all the pixel signals. After an image signal is output to the analog bus 106, it is externally output via the output buffer 108. Afterward, the CMOS sensor 10 turns off the S, closes the SW 104, proceeds to an operation for the next pixel, and performs the sequence of operations until all the pixel signals are output.

Therefore, the timings of TS [n]/RS [n]/S [n] are shifted by one pixel period, and a sequence of operations is performed 5,000 times to read the pixels of one line. Here, hsync is a horizontal-line synchronization signal, and it indicates the period of one horizontal line. Pixel data output from the CMOS sensor 10 is sequentially transferred to the AGC circuit 110, is amplified, and is forwarded to the ADC 112.

As the above-described operation is conducted on all the pixels, the operation for one clock of the pixel frequency is driven about 5,000 times in the CMOS sensor 10, and therefore a pixel is driven by using the pixel frequency of several to several dozens of MHz as a whole of the sensor. Thus, in the standby state where capturing is not conducted, the drive frequency is decreased, whereby the power consumption can be reduced.

However, according to conventional technologies, the signals of the 5,000 pixels that need to be transferred during the period of one line are serially output; therefore, the CMOS sensor needs to be driven at a high speed. That is, there is a problem in that, as the frequency needs to be increased to conduct high-speed driving, the power consumption is accordingly increased. Furthermore, in the case of a CMOS sensor that outputs image signals in parallel, the drive frequencies of TS, RS, and S can be highly reduced to several to several dozens of kHz; therefore, there is a problem in that a reduction in the power consumption is not much expected (less effective) by further decreasing the frequency.

Figure 3:
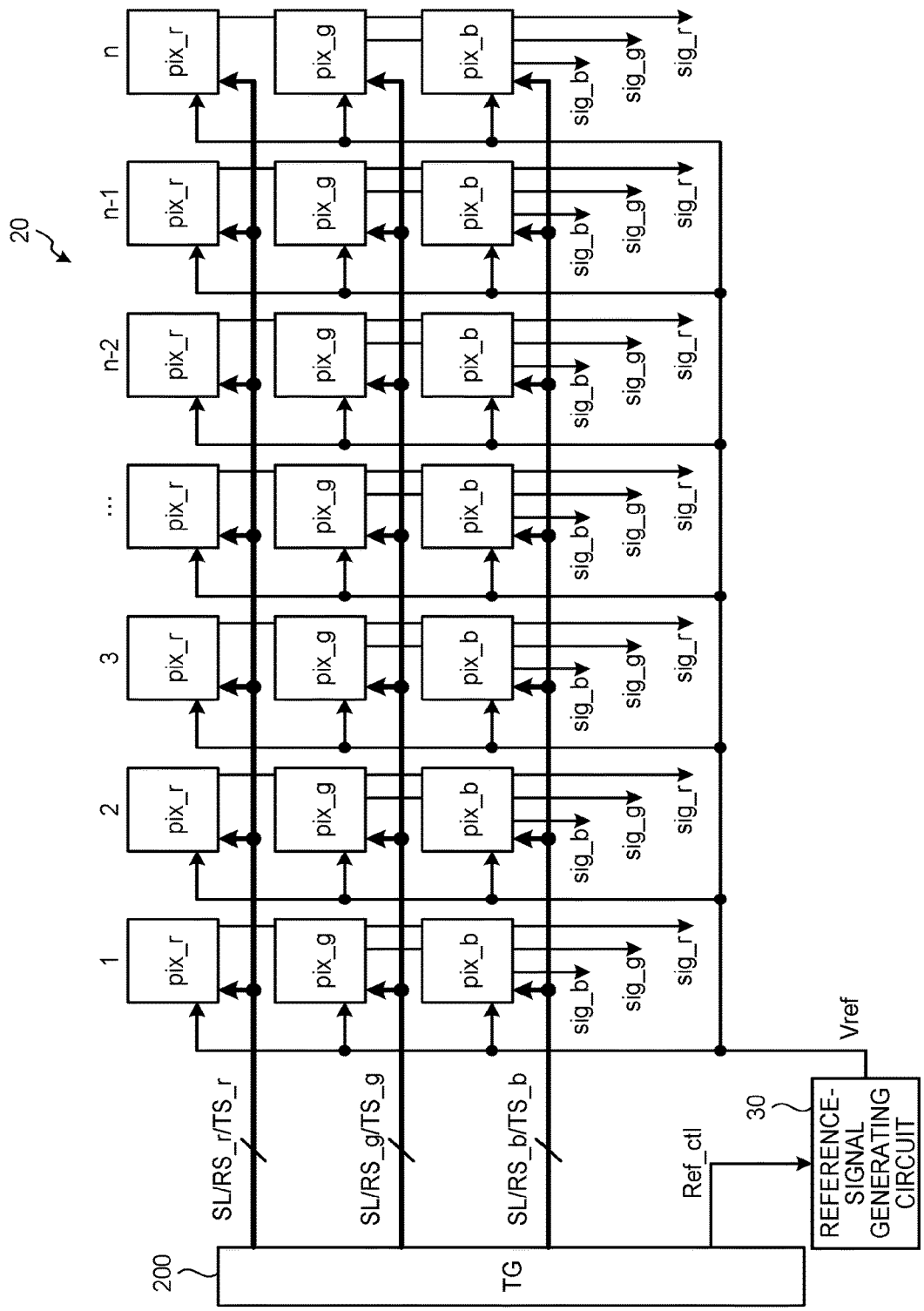
FIG. 3 is a diagram that schematically illustrates a CMOS sensor according to a first embodiment.

FIG. 3 is a diagram that schematically illustrates a CMOS sensor (CMOS linear sensor) 20 according to a first embodiment. The CMOS sensor 20 includes a photo diode (PD: a light receiving element) that generates an electric charge in accordance with the amount of incident light and includes a pixel array in which pixel units (pix_*) are arranged in one direction with respect to each color, the pixel unit including a pixel circuit that converts the electric charge from the PD, which is provided nearby, into a voltage signal, transfers it to a subsequent stage, and resets the voltage. If the CMOS sensor 20 is used in, for example, an image reading device to read an A3-size original document, about 7,500 pixel units (about 7,500 pixels×3 colors) are arranged in a main scanning direction with respect to each color. Here, * indicates any one of the colors of r/g/b. Furthermore, the same reference numeral is applied to a component of the CMOS sensor 20 that is substantially the same as a component of the CMOS sensor 10.

A reference-signal generating circuit 30 generates a control signal (Vref) that also serves as a reference signal (reference voltage) that is described later and outputs it to each pixel unit (pix_*). Therefore, the control signal (Vref) is sometimes referred to as the reference signal (Vref) or the reference voltage (Vref).

A control unit (TG: a timing control unit) 200 controls the operation timing, or the like, of each unit included in the CMOS sensor 20 by using a signal (SL, RS_*, and TS_*), or the like, for controlling the drive timing of the pixel unit. Furthermore, the control unit 200 controls the reference-signal generating circuit 30 by using a control signal Ref_ctl. The CMOS sensor 20 has a column configuration such that, for example, pixel units (e.g., pix_r, pix_g, and pix_b of 1), which are located at the same position with respect to a main scanning direction, output signals to a subsequent stage all together.

Figure 4:
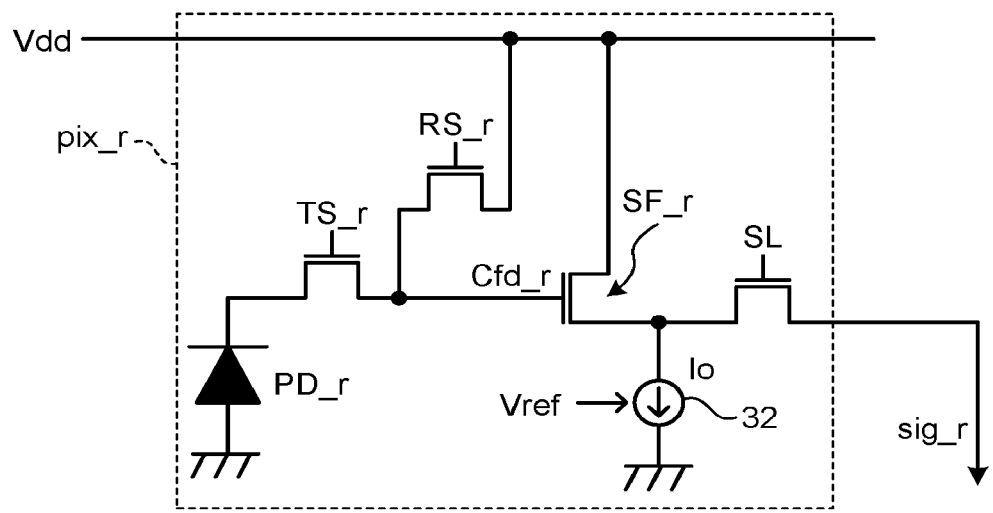
FIG. 4 is a diagram that illustrates a configuration of a pixel unit (pix_r)
Figure 5:
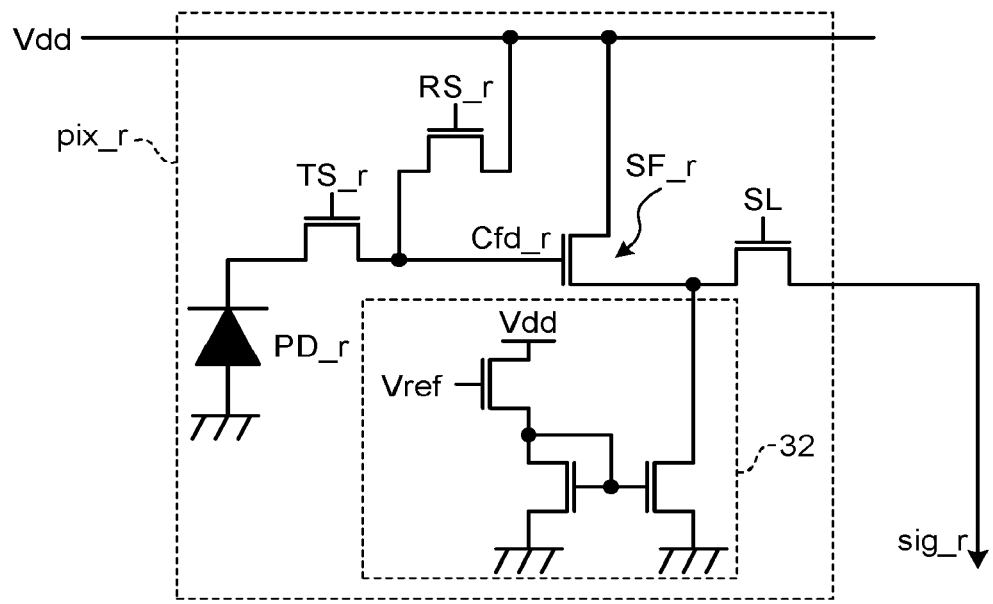
FIG. 5 is a diagram that illustrates a configuration of the pixel unit, and it illustrates a bias circuit in detail.

FIG. 4 is a diagram that illustrates a configuration of the pixel unit (pix_r). FIG. 5 is a diagram that illustrates a configuration of the pixel unit, and it illustrates a bias circuit in detail. Here, FIGS. 4 and 5 illustrate only an R pixel of an arbitrary column (RGB pixel units that are located at the same position with respect to a main scanning direction) for simplification.

Vdd is a power-supply voltage that is fed to the CMOS sensor 20, and it is the reference potential of a signal that is output from a pixel unit. A photo diode (PD_r) stores an electric charge in accordance with the intensity of incident light.

A reset signal (RS_r) that is fed by the control unit 200 is a signal for resetting an electric-charge detecting unit (Cfd_r: floating diffusion), which converts the electric charge stored in PD_r into a voltage, so as to have the reference potential, and it switches on/off a reset transistor. A transfer signal (TS_r) is a signal that is transferred to Cfd_r, which converts the electric charge stored in PD_r into a voltage signal, and it switches on/off a transfer transistor. After an analog signal (sig_r) is subjected to a voltage conversion by Cfd_r, it is output to a subsequent stage via a source follower transistor (SF_r), at the timing when a switch (SL) for writing to the subsequent stage is turned on.

Furthermore, a bias circuit 32 is connected to an output (source terminal) of the source follower transistor (SF_r), and the current constantly flows through the bias circuit 32 due to the control signal (Vref) for operating the pixel unit with accuracy. The bias circuit 32 has a current mirror configuration using the FET that is illustrated in FIG. 5.

As described above, the CMOS sensor 20 is a CMOS linear sensor that has a column configuration (for example, RGB 3 pixels/column) and transmits analog signals (sig_r, sig_g, and sig_b) in parallel on a per column basis to the subsequent stage; therefore, the frequency of the drive signal (SL, RS_*, and ST_*) of the pixel unit is in the order of several kHz, and thus it is very low compared to conventional CMOS sensors (conventionally, several MHz to several dozens of MHz).

The CMOS sensor 20 drives one pixel circuit at several to several dozens of kHz, and therefore the current of about several dozens of pA flows in accordance with the frequency, the capacitance of a switch unit in each drive clock unit, an applied voltage, or the like. Conversely, as the current of several dozens of μA constantly flows through the above-described bias circuit 32, the power consumption that is consumed by the bias circuit 32 is overwhelmingly large.

Figure 6:
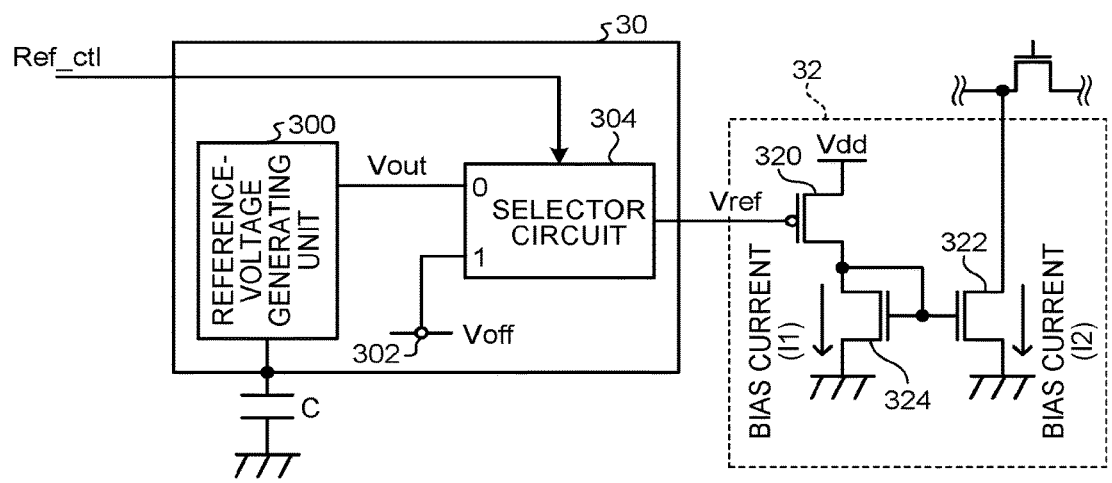
FIG. 6 is a diagram that illustrates an example of the configurations of a reference-signal generating circuit and the bias circuit.

FIG. 6 is a diagram that illustrates an example of the configurations of the reference-signal generating circuit 30 and the bias circuit 32. The reference-signal generating circuit (control-signal generating unit) 30 includes a reference-voltage generating unit (voltage generating unit) 300, an off-state voltage feeding unit 302, and a selector circuit 304. The reference-voltage generating unit 300 generates a voltage (Vout) of a predetermined potential for operating the bias circuit 32 and outputs it to the selector circuit 304. The off-state voltage feeding unit 302 feeds a voltage Voff (whose potential is different from that of Vout) for preventing an operation of the bias circuit 32 to the selector circuit 304. The selector circuit 304 selects any one of Vout and Voff in accordance with the control signal Ref_ctl that is output from the control unit 200, switches to the selected voltage, and outputs it as the control signal Vref to the bias circuit 32.

Specifically, the control unit 200 controls the reference-signal generating circuit 30 such that, in the case of the operating mode in which multiple processing units, such as the pixel units including the bias circuit 32, process signals, the control signal (Vref=Vout) is a voltage signal of a predetermined potential that is generated by the reference-voltage generating unit 300 and, in the case of the standby mode in which multiple processing units do not process signals, the control signal is a voltage signal (Vref=Voff) whose potential is different from the predetermined potential while the reference-voltage generating unit 300 generates the voltage of the predetermined potential.

In the CMOS sensor 20, the reference-signal generating circuit 30 is operated in any state, i.e., the operating state (the normal state) or the standby state, and the bias current flowing through the bias circuit 32, which is dominant in terms of the overall power consumption, is controlled by using the control signal (Vref) that is output from the reference-signal generating circuit 30. Specifically, the reference-signal generating circuit 30 stops the operation of the bias circuit 32 (=prevents the bias current from flowing), whereby the power consumption of the CMOS sensor 20 is reduced.

Next, with reference to FIG. 6, the operations of the reference-signal generating circuit 30 and the bias circuit 32 are explained in detail. If the CMOS sensor 20 is in the operating state (the operating mode), "0" of the selector circuit 304 is selected by using Ref_ctl from the control unit 200, and Vref=Vout is input to the bias circuit 32.

For example, with regard to Vref that is input to the gate terminal of a P-type MOSFET 320 of the bias circuit 32, the gate voltage is set such that a bias current (I2) flowing between the drain and the source of an N-type MOSFET 322 of a subsequently connected current mirror circuit becomes a desired value and, in order to obtain the voltage, a bias current (I1) flows between the drain and the source of an N-type MOSFET 324.

The ON resistance value between the source and the gate of the P-type MOSFET 320 is determined such that the bias current (I1) becomes a target value, and the ON resistance is determined in accordance with the voltage level of Vref. Conversely, if the CMOS sensor 20 is in the standby state (the standby mode), "1" of the selector circuit 304 is selected by using Ref_ctl from the control unit 200, and Vref=Voff is input to the bias circuit 32. Voff needs to be set such that the bias currents (I1) and (I2) are prevented from flowing; therefore, the level of Voff is set such that the ON resistance between the source and the drain of the P-type MOSFET 320 becomes a high resistance.

Even if the CMOS sensor 20 is in the standby state, the reference-voltage generating unit 300 is operated. This is because, in the standby state where the CMOS sensor 20 does not read images, the bias circuit 32 is stopped and, if the reference-voltage generating unit 300, which generates the control signal (Vref=Vout), is also stopped, it takes time to return to the operating state to read images.

This is because a high accuracy is required for the control signal (Vref) for operating the bias circuit 32, so is the reference-voltage generating unit 300 that generates it, and in order to prevent the effect of internal and external disturbance, a relatively large decoupling capacitor (C) is provided. Specifically, if the reference-voltage generating unit 300 is stopped once, it takes time to charge the decoupling capacitor (C), and therefore a returning time becomes longer until the control signal (Vref) has a desired voltage, i.e., the CMOS sensor 20 can perform the normal operation.

Therefore, the CMOS sensor 20 maintains the operation of the reference-voltage generating unit 300 to speed up the return from the standby state, in which images are not read, to the operating state in which reading is possible. Here, there is little difference between the power consumption due to the operation of the reference-voltage generating unit 300 in the standby state and the power consumption of the single bias circuit 32. In the CMOS sensor 20, the bias circuit 32 is provided for each pixel (about 22,500); however, as the bias current does not flow through each of the bias circuits 32 in the standby state, even if the reference-voltage generating unit 300 is operated in the standby state, the power consumption in the standby state is unquestionably small compared to that in the operating state.

Figure 7:
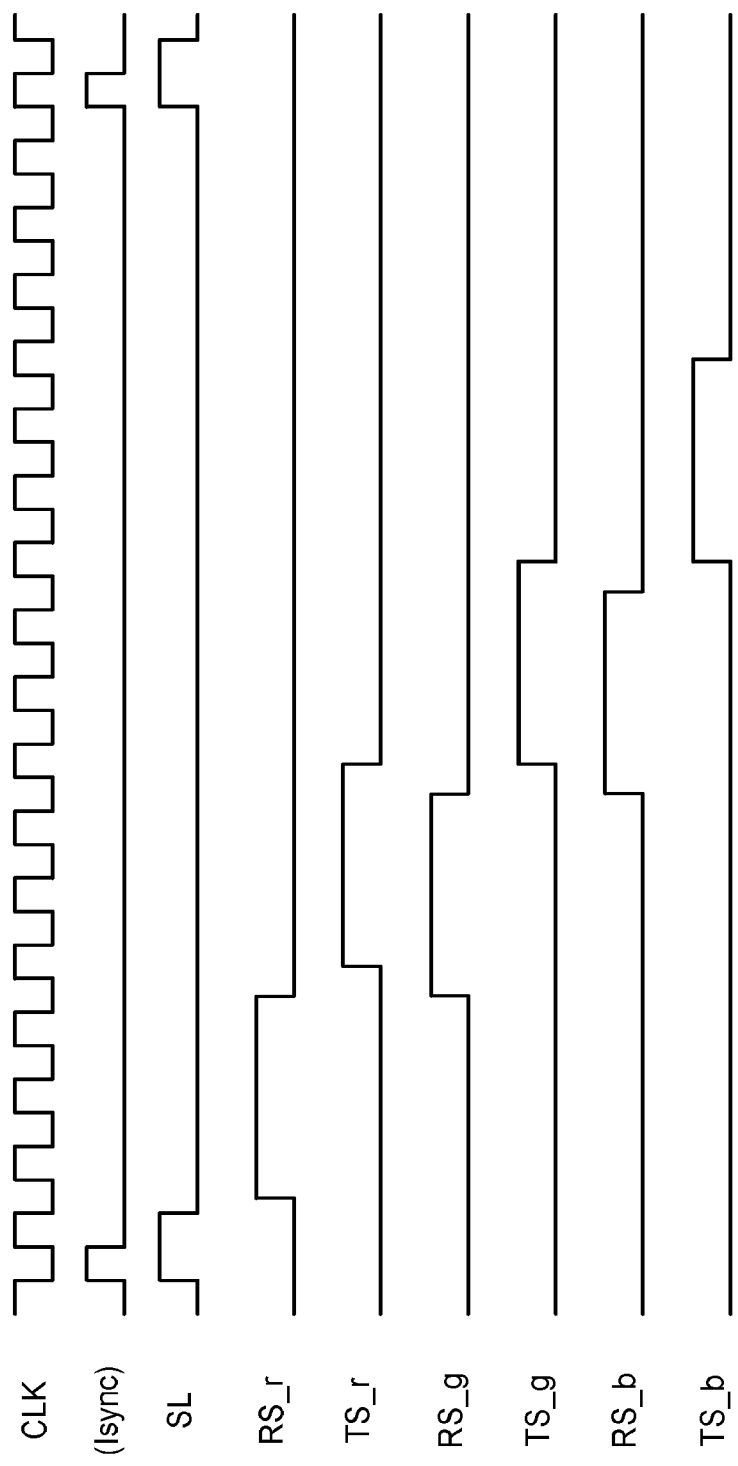
FIG. 7 is a timing chart that indicates drive timings of the CMOS sensor.

FIG. 7 is a timing chart that indicates the drive timings of the CMOS sensor 20. A drive signal of the CMOS sensor 20 is generated on the basis of the reference clock (CLK). lsync is a line synchronization signal, and it indicates the period of one main-scanning line of image data.

First, in a case where three pixels are a single column (pixel group), the control unit 200 turns on RS_r before starting the line and resets Cfd of the R pixel. Next, the control unit 200 turns on RS_g at the timing that is different from that of RS_r, further turns on RS_b at the timing that is different from those of RS_r and RS_g, and resets each of the three Cfd of the column once.

After resetting Cfd, the control unit 200 sequentially turns on TS_r to TS_b at the different timings so that the electric charge stored in the PD is transferred to Cfd. After an analog signal is subjected to a charge-voltage conversion by Cfd, it is output to the subsequent stage at the timing of SL.

As the CMOS sensor 20 concurrently performs the above operations on a per column basis, the frequency of the drive signal is very low compared to conventional CMOS sensors. Furthermore, in the timing chart that is illustrated in FIG. 7, three pixels of RGB in a column are sequentially operated (=rolling shutter operation); however, in the CMOS sensor 20, an analog memory is provided at the subsequent stage of a pixel circuit, and therefore three pixels of RGB can be simultaneously operated, and a global shutter operation may be performed.

Figure 8:
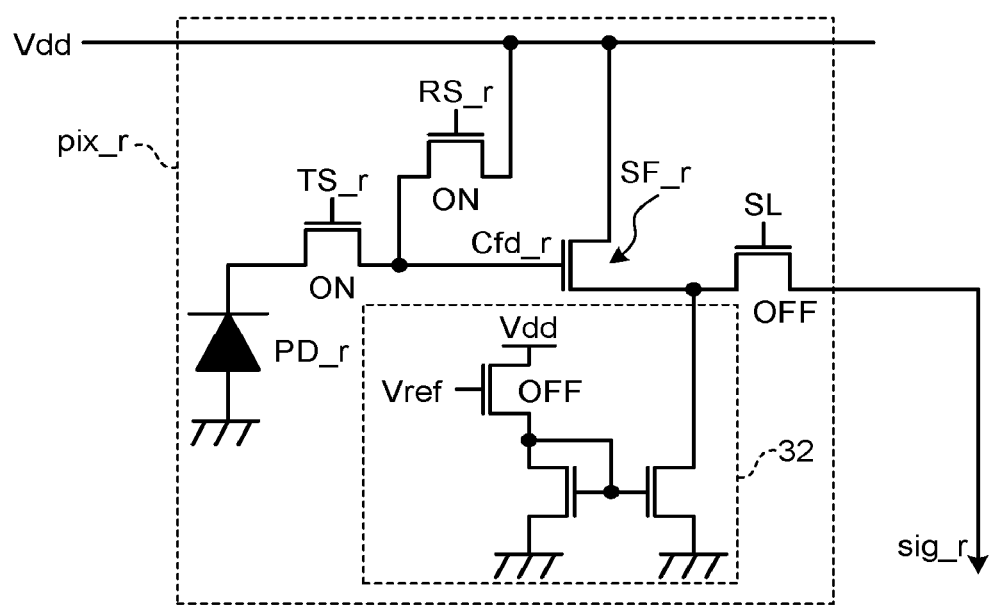
FIG. 8 is a diagram that illustrates a switch of a pixel unit in a case where the CMOS sensor is in a standby state and the states of a drive signal and a control signal.

FIG. 8 is a diagram that illustrates a switch (FET) of a pixel unit in a case where the CMOS sensor 20 is in a standby state and the states of the drive signal and the control signal. As illustrated in FIG. 8, in the standby state, TS_r is on, which is transferred to Cfd_r that converts the electric charge stored in PD_r into a voltage. Furthermore, RS_r is on, which sets the potential of Cfd_r to the reference voltage (Vdd). Moreover, to stop the operation of the bias circuit 32 in the standby state, the control signal (Vref) is turned off. As described above, the CMOS sensor 20 sets the pixel unit to the reset state while in the standby state, thereby speeding up the return to the operating state.

As the power of the reference voltage (Vdd) is supplied even in the standby state, a photoelectric conversion is performed by PD_r with a small amount of incident light so that an electric charge is generated, and an electric charge is stored in Cfd_r due to the dark current so that it is converted into a voltage. In the CMOS sensor 20, as the state illustrated in FIG. 8 is obtained in the standby state, Cfd_r is set to the reference voltage (Vdd) level, and the occurrence of an unintended signal output (sig_r) can be prevented during a return, whereby it is possible to speed up the returning time. Furthermore, turning off the control signal (Vref) is an operation to reduce the power consumption by stopping the operation of the bias circuit 32 in the standby state.

Furthermore, in the CMOS sensor 20, the writing switch (SL), which transfers the analog signal (sig_r) to the subsequent stage, is off during the standby state and during the state transition between the standby state and the operating state, whereby the subsequent stage that is connected to the pixel unit is electrically disconnected. This is because, as the pixel unit is reset while in the standby state (=Cfd is in the power-supply voltage level that serves as a reference), the writing switch (SL) is on and is connected to a circuit at the subsequent stage, and there is a possibility that a short circuit arises between the power source and the ground in some circuit states. That is, after the writing switch (SL) is turned off, the state transition is made to the pixel unit and the circuit at the subsequent stage that are connected via the writing switch (SL), whereby the occurrence of through-currents is prevented, and the occurrence of a short circuit between the power source and the ground in the worst case is prevented.

Figure 9:
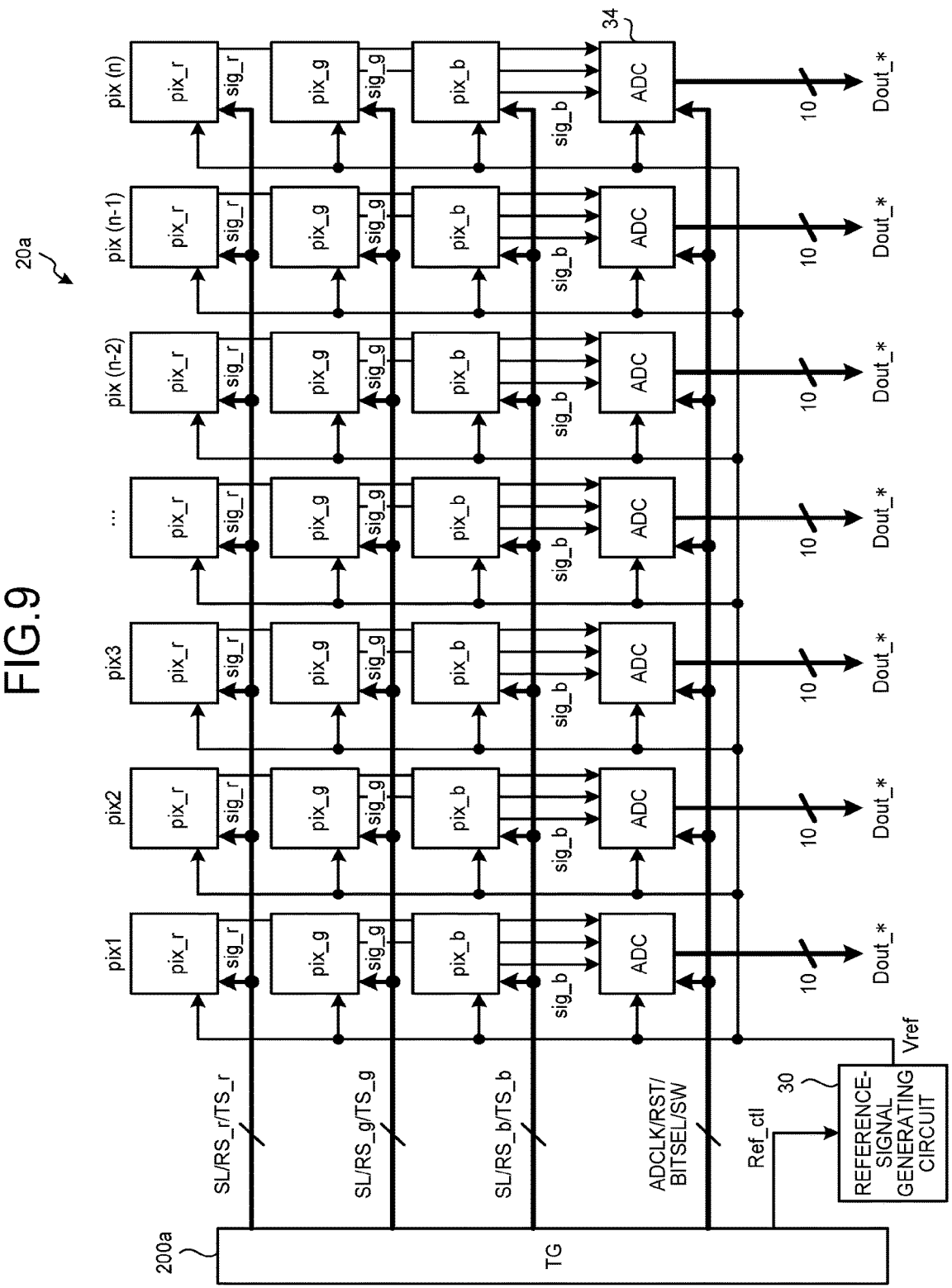
FIG. 9 is a diagram that schematically illustrates a CMOS sensor according to a second embodiment.

Next, an explanation is given of a CMOS sensor according to a second embodiment. FIG. 9 is a diagram that schematically illustrates a CMOS sensor (CMOS linear sensor) 20a according to the second embodiment. In the CMOS sensor 20a, for example, an A/D converter (ADC) 34 is provided for each column, which converts the analog signal (sig_*) output from the pixel unit (pix_*) into a digital signal (Dout_*). Here, the same reference numeral is applied to the component of the CMOS sensor 20a that is substantially the same as that of the CMOS sensor 20.

The ADC 34 is operated in accordance with the drive signal from the control unit 200a, and the control signal (Vref) input from the reference-signal generating circuit 30 is controlled by using Ref_ctl as is the case with the pixel unit (pix_*).

Figure 10:
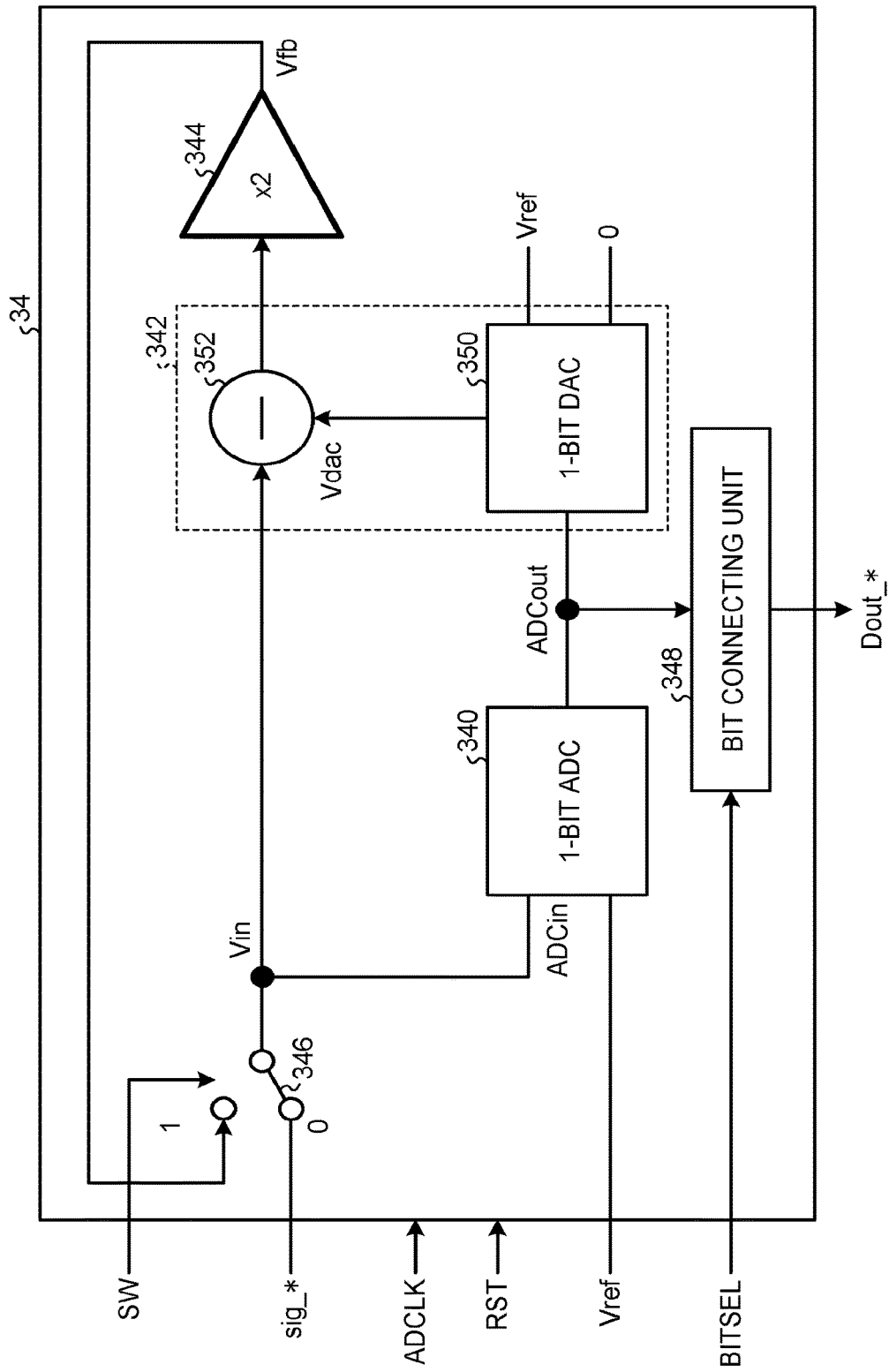
FIG. 10 is a diagram that schematically illustrates the configuration of an ADC.

FIG. 10 is a diagram that schematically illustrates the configuration of the ADC 34. Drive signals (ADCLK, RST, BITSEL, and SW) are fed from the control unit 200a to the ADC 34. As illustrated in FIG. 10, the ADC 34 is, for example, a cyclic A/D converter (cyclic ADC) that includes a determining unit 340, a calculating unit 342, an amplifying unit 344, a first switching unit 346, and a bit connecting unit (a connecting unit) 348.

The determining unit 340 is, for example, a 1-bit A/D converter (1-bit ADC), and it includes a comparator, or the like. The determining unit 340 determines whether the input processing-target voltage (sig_*: ADCin) is higher than the reference voltage (Vref) and outputs a determination result as a digital value (0, 1) to the calculating unit 342 and the bit connecting unit 348.

The calculating unit 342 includes a 1-bit D/A converter (a 1-bit DAC) 350 and a subtracting device 352. The 1-bit DAC 350 performs a D/A conversion on a digital value (ADCout) that is input from the determining unit 340 and outputs the analog-converted signal (Vdac: Vref or 0V) to the calculating unit 342. The subtracting device 352 subtracts the analog signal (Vdac) from the input processing-target voltage (Vin) and outputs the subtraction result (the subtracted voltage) to the amplifying unit 344.

Specifically, if the determining unit 340 determines that the processing-target voltage (sig_*), which is input to the determining unit 340, is higher than the reference voltage (Vref), the calculating unit 342 outputs the subtracted voltage, which is obtained by subtracting the reference voltage (Vdac=Vref) from the input processing-target voltage (Vin), and if the determining unit 340 determines that the processing-target voltage (ADCin), which is input to the determining unit 340, is equal to or lower than the reference voltage (Vref), outputs the input processing-target voltage (Vin).

The amplifying unit 344 is an amplifier whose amplification factor is set to 2, and it amplifies twice the processing-target voltage (Vin) or the subtracted voltage (Vin-Vref), which is output from the subtracting device 352, and outputs the amplified signal as an amplified signal (Vfb) to the first switching unit 346. The amplifying unit 344 includes, for example, two capacitances, and it amplifies an analog input signal (Vin-Vdac) from the subtracting device 352 by using the capacitance ratio.

The first switching unit 346 is, for example, an analog switch that is operated in accordance with a control signal SW, and it switches an analog input signal (Ain) or the amplified signal (Vfb) such that any one of them is input to the determining unit 340 and the calculating unit 342 as a processing-target voltage.

The bit connecting unit 348 connects a predetermined number of bits starting from the high-order bit of the digital value output from the determining unit 340 when a bit selection signal BITSEL is asserted, and it outputs a digital signal (Dout_*) that corresponds to the analog input signal (Ain).

The ADC 34 is operated in accordance with the clock (ADCLK) that is output from the control unit 200a, and it performs initialization in accordance with RST that is output from the control unit 200a at the start of processing of one pixel signal.

Figure 11:
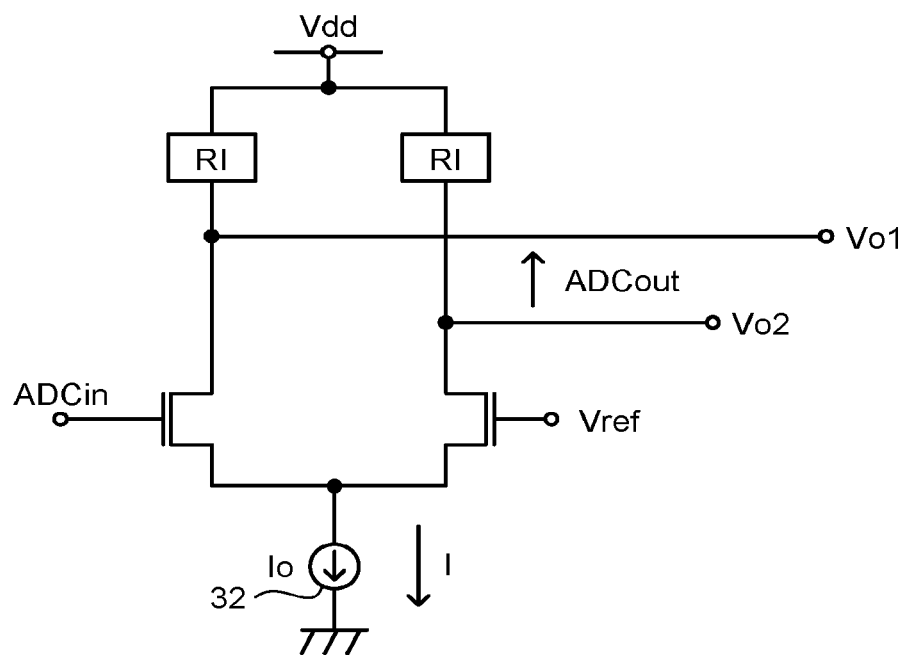
FIG. 11 is a diagram that schematically illustrates an internal circuit of an amplifying unit that is included in the ADC.

FIG. 11 is a diagram that schematically illustrates an internal circuit of the amplifying unit 344 that is included in the ADC 34. As illustrated in FIG. 11, a resistance load (Rl) is provided on the source side of the MOSFET, ADCout (Dout_*) that is an output from the ADC 34 is a differential amplification of ADCin (sig_*) that is an input signal and the reference voltage (Vref), and a current (I) constantly flows through the bias circuit 32 on the drain side during an A/D conversion operation. Furthermore, the differential amplification circuit illustrated in FIG. 11 is an example and, instead of the resistance load (Rl) on the source side of the FET, a current mirror circuit configuration that uses a different FET may be used.

With regard to the ADC 34 that converts the analog output (sig_*) from the pixel unit into the digital output (Dout_*) in the CMOS sensor 20a, the operation of the bias circuit 32 in the ADC 34 is stopped by using the control signal (Vref) while in the standby state, whereby the power consumption is reduced.

In the ADC 34, as the amount of electric power needed for an AD conversion is not small, decreasing the frequency needed for an AD conversion in the standby state is not less effective for a reduction in the power consumption. In such a case, for example, the bias current of the ADC 34 is several dozens of µA, and the current during an AD conversion operation is several hundreds of pA; therefore, in the case of the CMOS sensor 20 that is capable of reading an A3-size original document, stopping the bias circuits 32 that are built in the ADCs 34 of about 7,500 due to 3 pixels/column configuration is highly effective for a reduction in the consumption current.

Figure 12:
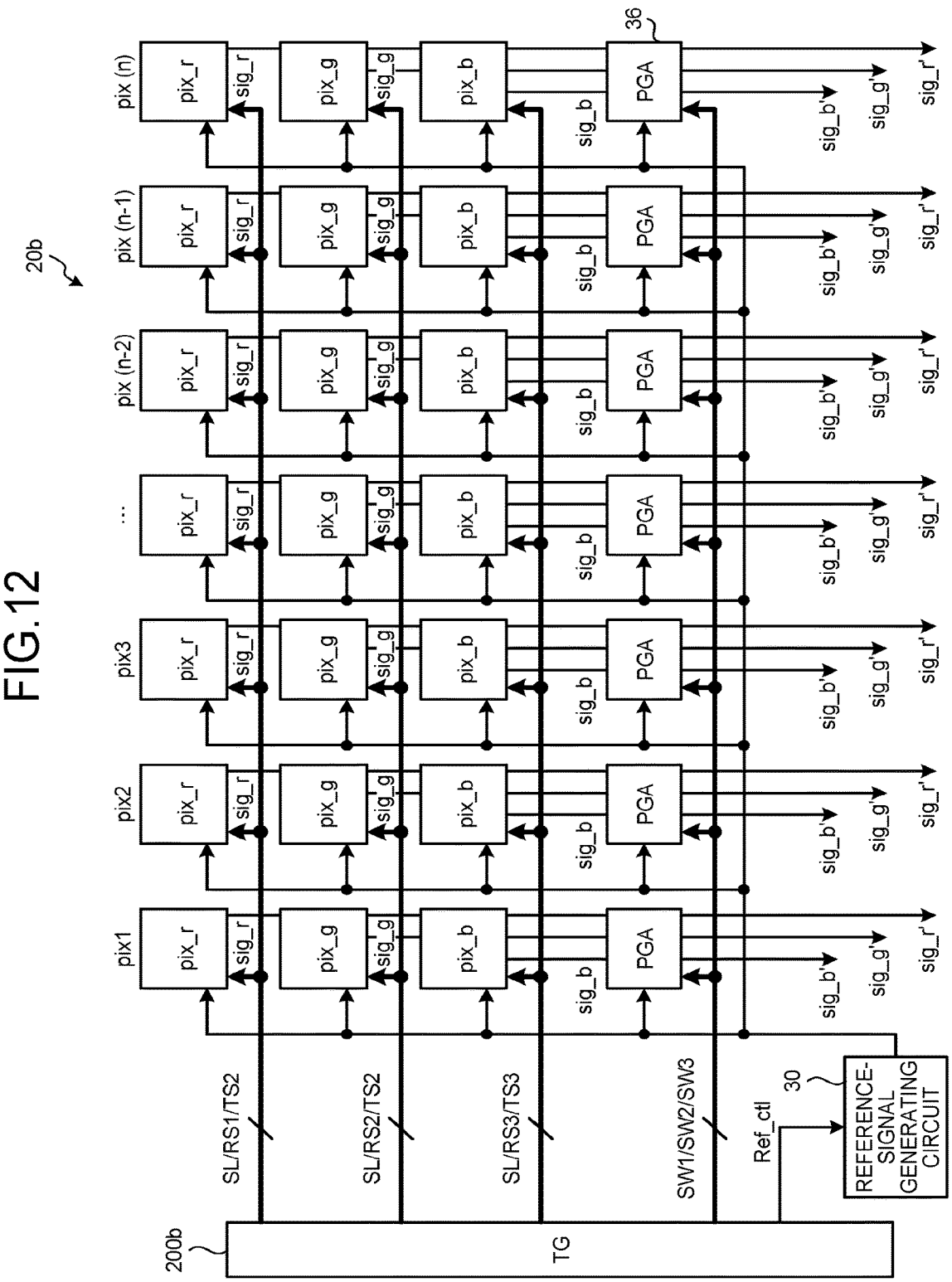
FIG. 12 is a diagram that schematically illustrates a CMOS sensor according to a third embodiment.

Next, an explanation is given of a CMOS sensor according to a third embodiment. FIG. 12 is a diagram that schematically illustrates a CMOS sensor (CMOS linear sensor) 20b according to the third embodiment. In the CMOS sensor 20b, an amplifier (PGA) 36 is provided for each column, which for example amplifies the analog signal (sig_*) output from the pixel unit (pix_*) and outputs it to the subsequent stage. Here, the same reference numeral is applied to the component of the CMOS sensor 20b that is substantially the same as the component of the CMOS sensor 20.

The PGA 36 is operated in accordance with the drive signal from a control unit 200b, and the control signal (Vref) input from the reference-signal generating circuit 30 is controlled by using Ref_ctl as is the case with the pixel unit (pix_*). Drive signals (SW1, SW2, and SW3) are fed from the control unit 200b to the PGA 36.

FIG. 13 is a diagram that illustrates the schematic configuration of the PGA 36 and equivalent circuits during operations. As it is difficult to configure a high-accuracy resistor in a MOS integrated circuit, such as a CMOS sensor, a switched capacitor circuit is often used, which performs an operation equivalent to a resistor by switching the connection of a capacitor by using a switch that uses a MOS-FET.

The basic configuration of the PGA 36 that amplifies an input voltage includes an operational amplifier, two capacitors, and three switches as illustrated in FIG. 13(a). The input voltage is the signal (sig_*) that is output from the pixel unit. The control signal (Vref) that is input from the reference-signal generating circuit 30 is the voltage that serves as a reference for amplification. The PGA 36 amplifies the difference between sig_* and Vref by using the capacitance ratio of the capacitor and outputs it as an output voltage (sig_*').

A detailed amplification operation of the PGA 36 is explained below. The PGA 36 first turns on SW1 and SW3 and turns off SW2. The equivalent circuit at this point is illustrated in FIG. 13(b). As the voltage on the right end of C1 is Vref due to the imaginary short of the operational amplifier, the voltage that is applied to both ends of C1 is sig_*−Vref. An electric charge Q1 that is charged to C1 is C1×(sig_*−Vref). The electric charge of C2 is zero as the voltages on both ends are equal.

Next, the PGA 36 turns off SW1 and SW3 and turns on SW2. The equivalent circuit at this point is illustrated in FIG. 13(c). The voltage on the left end of C1 is Vref, and the voltages on both ends are equal; therefore, the electric charge C1×(sig_*−Vref), which is charged into C1 at the state of FIG. 13(b), is discharged. As the input impedance of the operational amplifier can approximate infinity, the electric charge that is discharged from C1 is charged into C2 that is connected to C1 in series. As the voltage on the left end of C2 is Vref due to the imaginary short of the operational amplifier, an electric charge Q2 of C2 is C2×(sig_*'−Vref).

As the electric charge Q1=C1×(sig_*−Vref) that is discharged from C1 is equal to the electric charge Q2=C2×(sig_*'−Vref) that is charged from C1 to C2, i.e., Q1=Q2, the output voltage is Vout=C1/C2×(sig_*−Vref)+Vref. Specifically, the PGA 36 amplifies the difference between the output signal (sig_*) from the pixel unit and the control signal (Vref) from the reference-signal generating circuit 30 by using a capacitance ratio C1/C2, adds the control signal (Vref) as an offset, and outputs it.

As explained with reference to FIG. 13, the PGA 36 included in the CMOS sensor 20b performs a differential amplification of the input voltage (sig_*) and the control signal (Vref), and it is operated in the same manner as the circuit that is illustrated in FIG. 11.

When the CMOS sensor 20b is in the standby state, the operation of the bias circuit 32 is stopped by a differential amplification circuit inside the PGA 36. Specifically, the CMOS sensor 20b prevents the bias current from flowing while in the standby state, whereby the power consumption can be reduced.

Furthermore, each of the CMOS sensor 20, the CMOS sensor 20a, and the CMOS sensor 20b is an example of the processing device that includes multiple processing units (the pixel unit (the bias circuit 32), the ADC 34, the PGA 36, or the like) that, if the potential of the control signal is a predetermined potential, flow a predetermined current, process an input signal, and output it and, if the potential of the control signal is a potential that is different from the predetermined potential, do not flow a predetermined current and do not process a signal, and any combination of them is possible. That is, the CMOS sensor 20 may include the ADC 34, the PGA 36, or the like.

Figure 14:
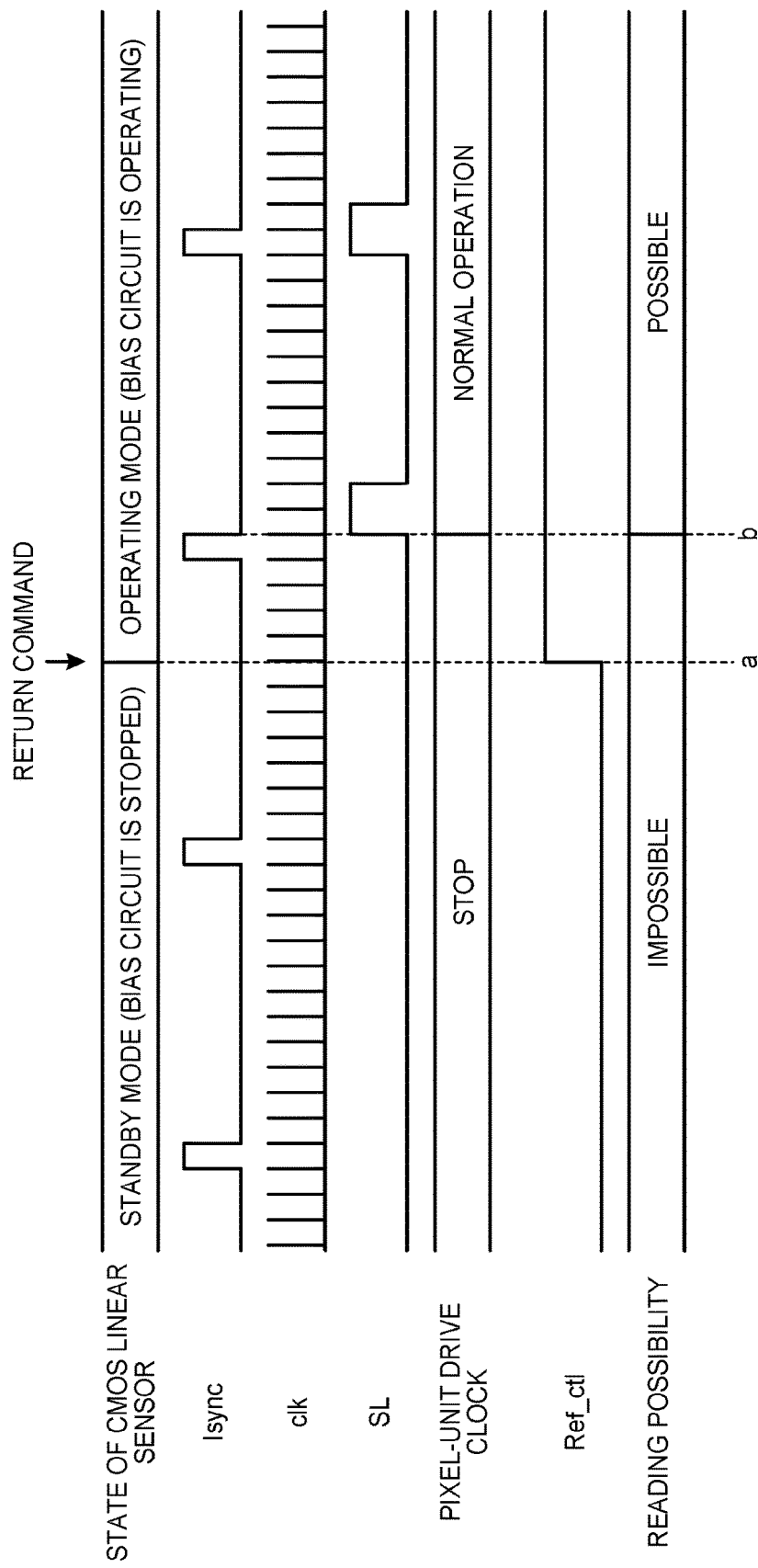
FIG. 14 is a timing chart that illustrates the timing in which the CMOS sensor returns from the standby state.

Next, an explanation is given of the return of the CMOS sensor 20 (the CMOS sensor 20a or the CMOS sensor 20b) from the standby state. FIG. 14 is a timing chart that illustrates the timing in which the CMOS sensor 20 (the CMOS sensor 20a or the CMOS sensor 20b) returns from the standby state. As illustrated in FIG. 14, when a return command is given at the timing a while in the standby state, the CMOS sensor 20 turns on the Ref_ctl signal for restarting the operation of the bias circuit 32.

Although the drive clock (drive signal) for the pixel unit in the standby state is explained with reference to FIG. 8, the CMOS sensor 20 does not normally operate the drive clock at the timing a. As a return command timing is decided by a user for which image reading is performed, it is difficult to expect the command timing. If a return command is given at the timing a that is illustrated in FIG. 14, for example, the drive clock is suddenly input again to a pixel unit in each column in the process of one line and, in some cases, it is difficult to obtain a predetermined ON period/OFF period that is needed for operations of RS and TS.

Specifically, there is a possibility that the RS or TS period is extremely short compared to that during the normal reading operation. Furthermore, there is a possibility that, as returning operations are concurrently started in the CMOS sensor 20, the output signals or the power source is disturbed or the timings of the drive clocks are shifted, which results in the occurrence of unexpected noises. The problem may be solved only by ensuring the stable period until noises are terminated, for example; however, it is difficult to deny the possibility of an irregular state where the normal operation is not returned due to noises unless the whole is reset or of damages to the device in the worst case.

It is practically impossible to handle the above as handling varies in accordance with the timing a. Therefore, an operation is performed at the start timing b of the subsequent line that is subsequent to the return command and thus, for the CMOS sensor 20, it is equivalent to the normal line start operation, it is possible to definitely ensure the ON period that is needed for an operation of the drive clock (RS or TS) that is fed to a pixel unit and the interval between different clocks, and it is possible to perform an operation in response to a return command. As described above, when returning from the standby state, the CMOS sensor 20 returns in synchronization with a line. Thus, the CMOS sensor 20 can prevent an unexpected operating state or damage to the device at worst after returning.

Furthermore, if the CMOS sensor 20 can instantly return to the normal operation in the process of one line, the signal that can be used as read data is an output after a return is made in the middle of one line; therefore, the output signal is not usable, and there is no difference in the case where a reading operation is started from the subsequent line. Furthermore, the difference between the retuning times of a and b is about several hundreds of μs at longest, and therefore the retuning time is not affected.

FIG. 15 is a conceptual diagram that conceptually illustrates the operating state and the standby state of the CMOS sensor 20 (the CMOS sensor 20a or the CMOS sensor 20b). The operating state of the CMOS sensor 20 as illustrated in FIG. 15 (a) is a state where the normal operation is performed (image reading is possible), a selector circuit (see FIG. 6) that is built in a reference generating unit 40 (the reference-signal generating circuit 30) is controlled by using a reference control signal that is output from a signal control unit 44 (the control unit 200), and a reference signal (the control signal Vref=Vout) that is generated by a reference-signal generating unit 400 (the reference-voltage generating unit 300) is output to operate a reference applying unit 420 (the bias circuit 32) that is built in an input/output unit 42 (multiple pixel units, the ADC 34, the PGA 36, or the like).

Conversely, in the standby state of the CMOS sensor 20 that is illustrated in FIG. 15 (b), the selector circuit, which is built in the reference generating unit 40 (the reference-signal generating circuit 30), is controlled, and the reference signal (the control signal Vref) is output to stop the operation of the reference applying unit 420 (the bias circuit 32) that is built in the input/output unit 42 (multiple pixel units, the ADC 34, the PGA 36, or the like). In the standby state, only the reference applying unit 420 (the bias circuit 32) is stopped, and others are operated in the same manner as that in the operating state.

Figure 16:
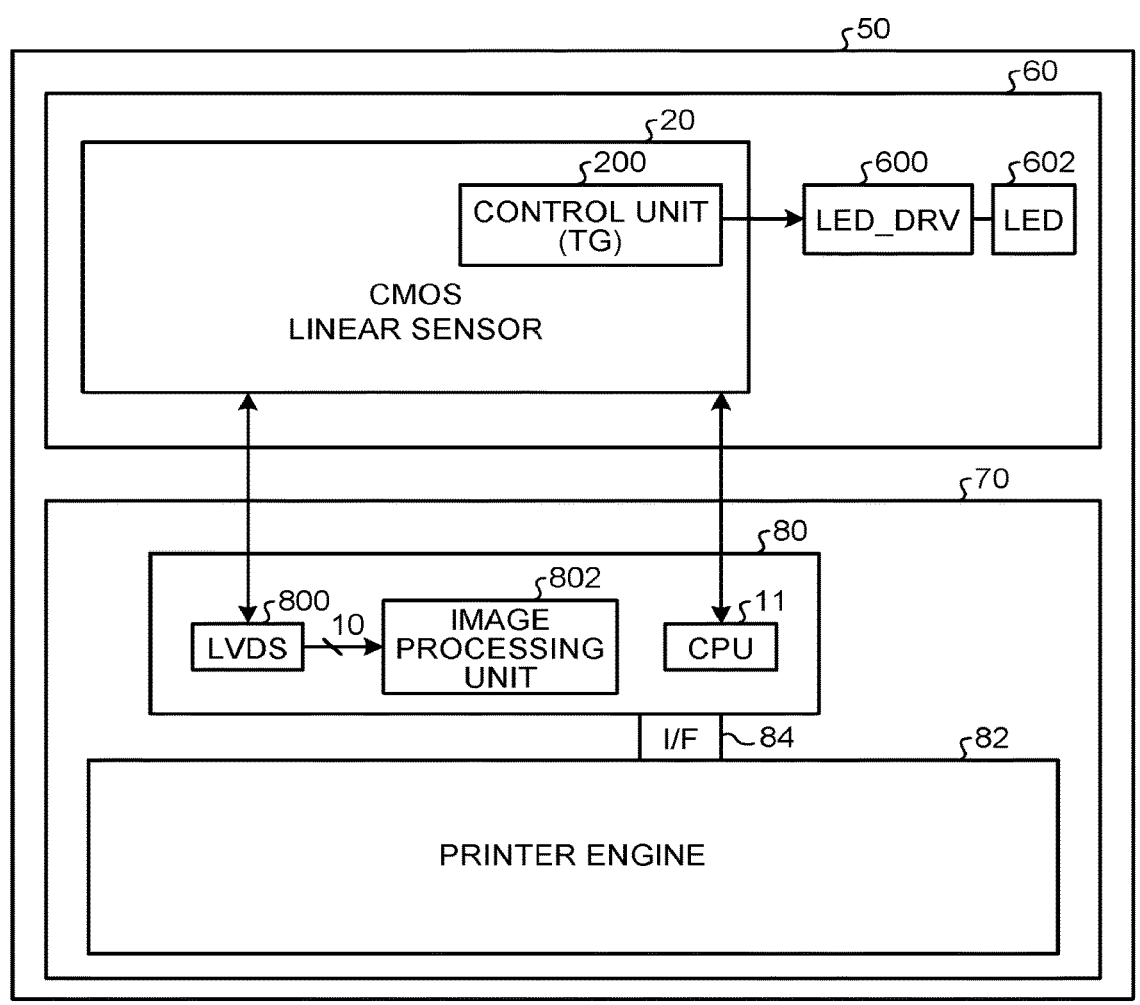
FIG. 16 is a diagram that schematically illustrates an image forming apparatus that includes an image reading device that includes the CMOS sensor.

Next, an explanation is given of an image forming apparatus that includes an image reading device that includes the CMOS sensor 20 according to an embodiment. FIG. 16 is a diagram that schematically illustrates an image forming apparatus 50 that includes an image reading device 60 that includes the CMOS sensor 20, for example. The image forming apparatus 50 is, for example, a copier or a multi-function peripheral (MFP) that includes the image reading device 60 and an image forming unit 70.

The image reading device 60 includes, for example, the CMOS sensor 20, an LED driver (LED_DRV) 600, and an LED 602. The LED driver 600 drives the LED 602 in synchronization with a line synchronization signal, or the like, that is output from the control unit 200. The LED 602 irradiates an original document with light. In synchronization with a line synchronization signal, or the like, the CMOS sensor 20 receives light that is reflected by the original document, and multiple light receiving elements generate an electric charge and start to store it. Then, after performing an AD conversion, or the like, the CMOS sensor 20 outputs image data to the image forming unit 70 via a parallel-serial converting circuit, or the like.

The image forming unit 70 includes a processing unit 80 and a printer engine 82, and the processing unit 80 and the printer engine 82 are connected to each other via an interface (I/F) 84.

The processing unit 80 includes an LVDS 800, an image processing unit 802, and a CPU 11. The CPU 11 controls each unit, such as the CMOS sensor 20, included in the image forming apparatus 50. Furthermore, the CPU 11 (or the control unit 200) performs a control such that each light receiving element starts to generate an electric charge in accordance with the amount of received light substantially at the same time.

The CMOS sensor 20 outputs, to the LVDS 800, for example, the image data on an image that is read by the image reading device 60, a line synchronization signal, a transmission clock, or the like. The LVDS 800 converts the received image data, the line synchronization signal, the transmission clock, or the like, into parallel 10-bit data. The image processing unit 802 performs image processing by using the converted 10-bit data and outputs image data, or the like, to the printer engine 82. The printer engine 82 performs printing by using the received image data.

According to the present embodiments, it is possible to provide an advantage such that a reduction in the power consumption during the standby mode can be achieved as well as a speed-up of a return from the standby mode to the operating mode.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A processing device comprising:
    a control-signal generating circuit that includes a voltage generating circuit that generates a voltage of a predetermined potential and that generates a control signal by switching the predetermined potential and a potential that is different from the predetermined potential;
    multiple CMOS processing circuits that
        flow a predetermined current, process and output an input signal, in response to a potential of the control signal being the predetermined potential, and
        do not flow the predetermined current and do not process a signal, in response to a potential of the control signal being the potential that is different from the predetermined potential,
        wherein at least one of the multiple processing circuits includes a bias circuit, and
        wherein the predetermined current is a bias current of the bias circuit; and
    a control circuit that controls the control-signal generating circuit such that, in a case of an operating mode in which the CMOS processing circuits process a signal, the control signal is a voltage signal of the predetermined potential that is generated by the voltage generating circuit, and in a case of a standby mode in which the CMOS processing circuits do not process a signal, the control signal is a voltage signal of the potential that is different from the predetermined potential while the voltage generating circuit generates a voltage of the predetermined potential.

2. The processing device according to claim 1, wherein at least one of the CMOS processing circuits includes:
    a light receiving element that generates an electric charge in accordance with a light signal;
    a floating diffusion that converts an electric charge generated by the light receiving element into a voltage signal;
    a reset transistor that resets the floating diffusion;
    a transfer transistor that transfers the electric charge generated by the light receiving element to the floating diffusion;
    an amplifying transistor that amplifies and outputs the voltage signal converted by the floating diffusion to a subsequent stage; and
    in response to a potential of the control signal being the predetermined potential, the bias circuit flows the predetermined current to the amplifying transistor.

3. The processing device according to claim 2, wherein the control circuit further performs a control such that the light receiving element enters a reset state in a case of a standby mode in which the CMOS processing circuits do not process a signal.

4. The processing device according to claim 2, wherein the control circuit further performs a control such that, in a case of the standby mode, in a case of a transition from the standby mode to the operating mode, and in a case of a transition from the operating mode to the standby mode, the floating diffusion is electrically disconnected from a subsequent circuit that receives a voltage signal from the floating diffusion.

5. The processing device according to claim 1, wherein the at least one of the CMOS processing circuits further includes an A/D converter that includes the bias circuit and that performs an operation to convert an input analog signal into a digital signal and outputs the digital signal.

6. The processing device according to claim 1, wherein the at least one of the CMOS processing circuits further includes an amplifier that includes the bias circuit and that amplifies and outputs an input signal.

7. The processing device according to claim 1, wherein the control circuit controls the control-signal generating circuit in synchronization with a synchronization signal when the standby mode transitions to the operating mode.

8. An image reading device comprising the processing device of claim 1.

9. An image forming apparatus comprising the image reading device of claim 8.

10. The processing device according to claim 1, wherein the at least one of the CMOS processing circuits includes:
   a CMOS sensor having a column configuration with n columns (n>1), and
   an A/D converter that includes the bias circuit, the A/D converter being provided for each column and converts the analog electric charge signal output from a pixel associated with each column into a digital output signal.

11. The processing device according to claim 10, wherein each column includes a red, a green and a blue (RGB) pixel.

12. The processing device according to claim 10, wherein at least one of the CMOS processing circuits includes:
   an amplifier being provided for each column that amplifies the signal for each pixel column and outputs the amplified signal to a subsequent stage within the CMOS sensor.

13. The processing device according to claim 10, wherein the bias circuit is provided for each column.

14. The processing device according to claim 1, wherein the bias circuit includes a current mirror configuration using two or more field effect transistors (FET), the predetermined current being a current associated with at least one of the two or more FETs.

15. A processing method performed by a processing device, the method comprising:
   at a control-signal generating circuit, generating a control signal by switching a predetermined potential and a potential that is different from the predetermined potential, the control-signal generating circuit including a voltage generating circuit that generates a voltage of the predetermined potential;
   at multiple CMOS processing circuits,
      flowing a predetermined current, and processing and outputting an input signal in response to a potential of the control signal being the predetermined potential, and
      not flowing the predetermined current and not processing the signal in response to a potential of the control signal being the potential that is different from the predetermined potential,
   wherein at least one of the multiple CMOS processing circuits includes a bias circuit, and
   wherein the predetermined current is bias current of the bias circuit; and
   at a control circuit, controlling the control-signal generating circuit such that, in a case of an operating mode in which the CMOS processing circuits process a signal, the control signal is a voltage signal of the predetermined potential that is generated by the voltage generating circuit and, in a case of a standby mode in which the CMOS processing circuits do not process a signal, the control signal is a voltage signal of the potential that is different from the predetermined potential while the voltage generating circuit generates a voltage of the predetermined potential.

16. A processing device comprising:
   control-signal generating means that include voltage generating means that generate a voltage of a predetermined potential and generate a control signal by switching the predetermined potential and a potential that is different from the predetermined potential;
   multiple CMOS processing means that
      flow a predetermined current, process and output an input signal, in response to a potential of the control signal being the predetermined potential, and
      do not flow the predetermined current and do not process a signal, in response to a potential of the control signal being the potential that is different from the predetermined potential,
   wherein at least one of the multiple CMOS processing means includes a bias circuit, and
   wherein the predetermined current is a bias current of the bias circuit; and
   control means that control the control-signal generating means such that, in a case of an operating mode in which the multiple CMOS processing means process a signal, the control signal is a voltage signal of the predetermined potential that is generated by the voltage generating means and, in a case of a standby mode in which the multiple CMOS processing means do not process a signal, the control signal is a voltage signal of the potential that is different from the predetermined potential while the voltage generating means generate a voltage of the predetermined potential.

* * * * *